United States Patent [19]
Geng

[11] Patent Number: 6,028,672
[45] Date of Patent: Feb. 22, 2000

[54] HIGH SPEED THREE DIMENSIONAL IMAGING METHOD

[75] Inventor: Zheng Jason Geng, Rockville, Md.

[73] Assignee: Zheng J. Geng

[21] Appl. No.: 08/720,462

[22] Filed: Sep. 30, 1996

[51] Int. Cl.[7] .................................................. G01B 11/24
[52] U.S. Cl. ....................................... 356/376; 250/237 G
[58] Field of Search .......................... 356/376; 250/237 G

[56] References Cited

U.S. PATENT DOCUMENTS

| | | | |
|---|---|---|---|
| 5,018,854 | 5/1991 | Rioux | 356/376 |
| 5,135,309 | 8/1992 | Kuchel et al. | 356/376 |
| 5,237,404 | 8/1993 | Tanaka et al. | 356/376 |
| 5,381,235 | 1/1995 | Inoue et al. | 356/376 |

FOREIGN PATENT DOCUMENTS

| | | | |
|---|---|---|---|
| 52-56556 | 5/1977 | Japan | 356/376 |
| 2-110305 | 4/1990 | Japan | 356/376 |

Primary Examiner—F. L. Evans

[57] ABSTRACT

The target of the present invention is to provide a high speed, low-cost, multi-mode three-dimensional (3D) surface profile measurement method. The proposed Rainbow Stereo 3D Camera exploits the projected color light with a spatially distributed wavelength spectrum on the surface of objects in the scene. Multiple color imaging sensors separated by a baseline distance are used to capture stereo pair images of the scene at camera's frame rate. The 3D depth values are calculated using triangulation principle by finding pixels corresponding to a common color feature in both images. Unlike conventional stereo correspondence matching algorithms, which requires the feature extraction from a group of pixels, the proposed method utilizes a projected rainbow color pattern as unique landmarks of each pixel for correspondence registration. Essentially, the colors of pixels in a pair of stereo images are used as a "token" to perform the stereo match. Searching corresponding point in a pair of stereo images becomes a straightforward pixel-to-pixel color matching. A simple and efficient 3D triangulation algorithm can be formulated to generate full frames of 3D images in high speed.

6 Claims, 10 Drawing Sheets

Operation Principle of the Rainbow Stereo 3D Camera

Figure 1. Operation Principle of the Rainbow Stereo 3D Camera

Figure 2. Implementation of Rainbow Stereo 3D Imaging Using One CCD and a pair LCD Shutter Figure 3. Spectral Characteristics of a Linear Variable Wavelength Filter (LVWF)

Figure 4. Color Representation and PQ Transformation

Figure 5.  Epipolar Geometry

Figure 6. Color Based Matching Using Sum of Squared Difference (SSD) Criterion

Figure 7. Using a Prism to Generate Variable Wavelength Illumination

Figure 8. Fraunhofer Diffraction

HIGH SPEED THREE DIMENSIONAL IMAGING METHOD

CROSS-REFERENCE TO RELATED APPLICATION

This application is a continuation-in-part of Applicant's previous application, U.S. Ser. No. 08/397,766 filed Mar. 2, 1995 now (U.S. Pat. No. 5,675,407) issued to Geng on Oct. 7, 1997, which is incorporated herein by reference in its entirely.

FIELD OF INVENTION

This invention presents a method and apparatus to obtain high frame rate three-dimensional (3D) images and surface profile measurements based on spatially varying wavelength spectral light illumination and principles of triangulation. We call this system the "Rainbow Stereo 3D camera".

PRIOR ART

For machine vision applications such as autonomous vehicle, mobile robot, object recognition, and 3D modeling of alive objects, full frame 3D images produced by a high speed 3D imaging system is necessary. By the full frame 3D range image, we mean that the value of each pixel in the image represents the distance from video camera's focal point to the corresponding surface point on the object in the scene. By high speed, we mean the 3D imaging system is able to output a stream of 3D images at the frame rate of a video camera (i.e., 30 Hz or faster).

In the past, many techniques for generating 3D images have been proposed. These techniques can be categorized into passive techniques (which do not use an active illumination) or active techniques (which employ active illumination).

A typical passive 3D vision technique is stereo vision. A conventional stereo vision system uses two cameras to observe a scene just as with human vision. By processing the stereo pair of images, the 3D surface profile of objects in the scene can be computed. The stereo method works by finding a common feature which is visible in two images. Therefore, the three dimensional surface profile information can not be obtained using data from just a single pixel due to ambiguity. Instead, such information must be extracted from a group of pixels. There are two classes of methods to match group pixels, namely, feature-based matching and area-based matching.

Feature-based stereo matching approaches employ image features like edges and corners to perform correspondence matching between stereo image pairs. This type of methods focus attention to the places in the images where there is the maximum information content, therefore it is often a robust way to implement stereo vision. However, a major drawback of the feature-based approach is that depth data provided by this kind of techniques is sparse due to the relatively small number of "interesting" features, hence these approaches can not provide dense (full frame) 3D images.

Area-based stereo matching approaches, on the other hand, determine the correspondence pixels in a stereo pair based on criteria of local similarity of small image patches. Historically, this type of approaches cross-correlate gray-scale patches in the left and right images using either a normalized dot-product cross correlation function or some form of a Euclidean distance measure. Peaks in the resulting correlation space are then used as pointers to the most likely correspondences. In general, existing gray-scale correlation techniques suffer from a lack of robustness to object rotation between views and occlusions. Such techniques can not be used to obtain 3D surface profile of the objects with no surface features. In addition, area-based correspondence matching process is very computationally intensive and with today's state of the art, cannot be computed at frame rates.

Active 3D techniques are generally based on principles of structured light or time of flight. Examples of popular structured light techniques include light stripe method, and moiré interferometry.

Active Triangulation 3D surface profile finding by triangulation is based on the fact that if a base line and the two angles of a triangle are known the lengths of the other sides may be determined. In the most straightforward form of active triangulation a beam of light is used to form a bright stripe on an object's surface and a camera displaced in a known distance(base line) from the light source views the scene. One angle of the triangle is defined by the angle to the base line of the beam of the light and the other angle is measured via the position of the light strip in the camera (CCD array or lateral effect photodiode).

Structured Illumination

In both the light stripe and the single dot approach, the projected feature must be scanned over the scene for an overall measurement to be made. The need for scanning may be removed and the efficiency of use of a 2D CCD camera may be increased significantly by the projection of a pattern of light such as an array of dots, stripes, or a grid simultaneously onto the scene. However the problem of ambiguity is aroused as to matching each of the stripes in the image with each projected strips. Furthermore, such method can not achieve single pixel resolution of range image because processing information from a group of pixels is required to determine the location of a structured light element (a dot or a stripe) in the image.

Active Triangulation Using Special CCD Camera

Assume that the plane of light scans rapidly across the scene so that the entire scene is scanned within one frame time. A special CCD camera is built so that the output values of camera pixels represent the angle at which the scanning line hit that pixel, instead of the amount of light which has hit the pixel. The geometry of the CCD array provides additional angle associated with the pixels so the range can be calculated based on these two angle and the length of the base line. The camera pixels are implemented using capacitors which store given charges before plane light scanning starts and gradually discharge when the scanning starts until the bright line image passes through the pixels. Arithmetic logic is then counts the remaining charges on the capacitors and provides angle information. This method is able to provide a high speed and single pixel resolution range image. However, it requires scanning plane of light.

Moiré Contouring

Moiré techniques use some form of structured light, typically a series of straight lines in a grating pattern, which is projected onto an object in the scene. This pattern on the object is then viewed from some other angle through a secondary grating, presenting a view of the first grating line which has been distorted by the contour of the part. The viewed image contains the moiré beat pattern. To determine the 3D contour of the object, the moiré techniques based on the phase shifting, fringe center mapping, and frequency shifting rely heavily on both extensive software analysis and rigorous hardware manipulation to produce different moiré patterns of the same object.

In addition to various 3D vision methods discussed above, there are numerous literature that present other methods of obtaining 3D surface profiles:

Range From Focus

It is possible to generate range data from focus information. Using a high speed image processing computer the sharpness of an image can be measured in real time, at any point in the image where there is a distinguishable feature. There is a direct relationship between focus and range, so that if focus can be determined in real-time, range can likewise be determined in real-time. In order to determine the range to a multiplicity of points the sharpness of focus must be determined for each or those points. In order to obtain this information, many images must be captured with different focal distances. If a part of the image is determined to be in focus, then the range to that part of the image can be easily calculated. The focal length must, in effect be swept from too close to just right to too far. Range from focus method requires expensive hardware. It is slow because many different focus settings must be used and at each focus setting, a new image must be captured and analyzed. Furthermore only the range to features can be computed.

Time-Of-Flight 3D ranging methods based on concept of time of flight measure directly the range to a point on an object by measuring the time required for a light pulse to travel from a transmitter to the surface and back to a receiver or by the measurement of the relative phase of modulated received and transmitted signals. The "laser radar" approaches actually scan with a single spot, and effectively measure the range to each point in the image one point at a time. Scanning of the light beam is required in order to obtain a full frame of range image, and hence is limited in speed.

SUMMARY OF THE INVENTION

The Rainbow Stereo 3D camera is based on a novel approach to producing a continuous spatially varying wavelength (rainbow-like color) illumination of the scene. Two color CCD cameras or two locations of a camera separated by a baseline distance are used to capture stereo pair images of the scene at camera's frame rate. The 3D depth values are calculated using triangulation principle by finding pixels corresponding to a common color feature in both images.

Unlike conventional stereo correspondence matching algorithms, which requires the feature extraction from a group of pixels, the proposed Rainbow Stereo 3D camera exploits a projected rainbow color pattern as unique landmarks of each pixel for correspondence registration. Essentially, the colors of pixels in a pair of stereo images are used as a "token" to perform the stereo match. Searching corresponding point in a pair of stereo images becomes a straightforward pixel-to-pixel color matching. A simple and efficient 3D triangulation algorithm can be formulated to generate full frames of 3D images in high speed.

DESCRIPTION OF THE PREFERRED EMBODIMENTS

Basic Operating Principle

Figure 1:
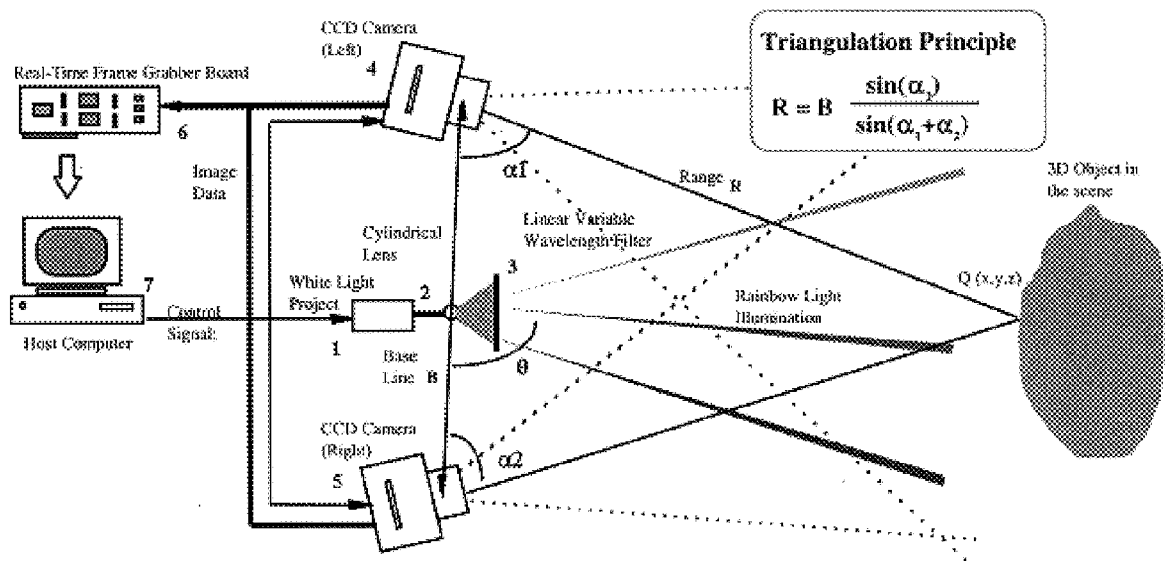
FIG. 1 illustrates the operating principle of the present invention of the Rainbow Stereo 3D camera.

FIG. 1 shows the operating principle of the Rainbow Stereo 3D camera system. The light projector, marked 1, generates a sheet of white light which passes through a cylindrical lens, marked 2, to form a "fan beam" light source. This fan beam light passes through a linear variable wavelength filter(LVWF), marked 3, to lighten the scene containing objects of interest, such that different portions of object surface are illuminated by projected lights with different colors. The LVWFs are commercially available and can be obtained from several manufacturers in USA. The reflected light is detected by a pair of color CCD cameras, marked 4 and 5. The images, which contain both intensity and color components, will be grabbed by a real time frame grabber board, marked 6, into a host computer, marked 7, to perform pixel-to-pixel color matching and triangulation calculation, based on the similarity of color patterns and intensity variation in the neighborhood of pixels in stereo image pairs.

The color spectrum of pixels on the captured images is determined by the proportion of Red, Green and Blue components (RGB) associated with the individual pixel therefore pixel-to-pixel registration can be easily performed based on the match of color components of counterparts. Since the length of "base line", B, between two cameras is known, and the geometrical and optical parameters of two cameras can be obtained from a priori calibration procedure, the locations of a pair of corresponding pixels in a stereo image pair provide sufficient information to determine viewing angles $\alpha 1$ and $\alpha 2$. The range values, R, associated with each pixel between a camera and surface points can be obtained using a straightforward triangulation:

$$R = B \frac{\sin(\alpha_2)}{\sin(\alpha_1 + \alpha_2)}$$

A full frame of 3D image can be obtained from a single snap shot of image set, and a stream of 3D images can be generated at camera's frame rate (30 frames per second or higher).

The spatially varying color pattern generated by the LVWF offers a simple and elegant way to encode continuous varying and distinguishable features to object's surface in the scene. Unlike scanning laser beam approach, the distinguishable illumination is generated simultaneously and without using any physically moving parts. Since our system uses active structured light to illuminate the scene, the Rainbow Stereo 3D camera can work well with featureless surface, such as a flat wall of uniform color, to which conventional passive stereo vision systems usually fail to provide accurate stereo matches. The performance of our stereo matching and triangulation methods is less dependable on features on object surface, such as edges and corners that are only possessed by a limited class of objects, hence this Rainbow Stereo 3D scheme has much wider application domain.

An Implementation of Rainbow Stereo Imaging System Using Single Camera

Figure 2:
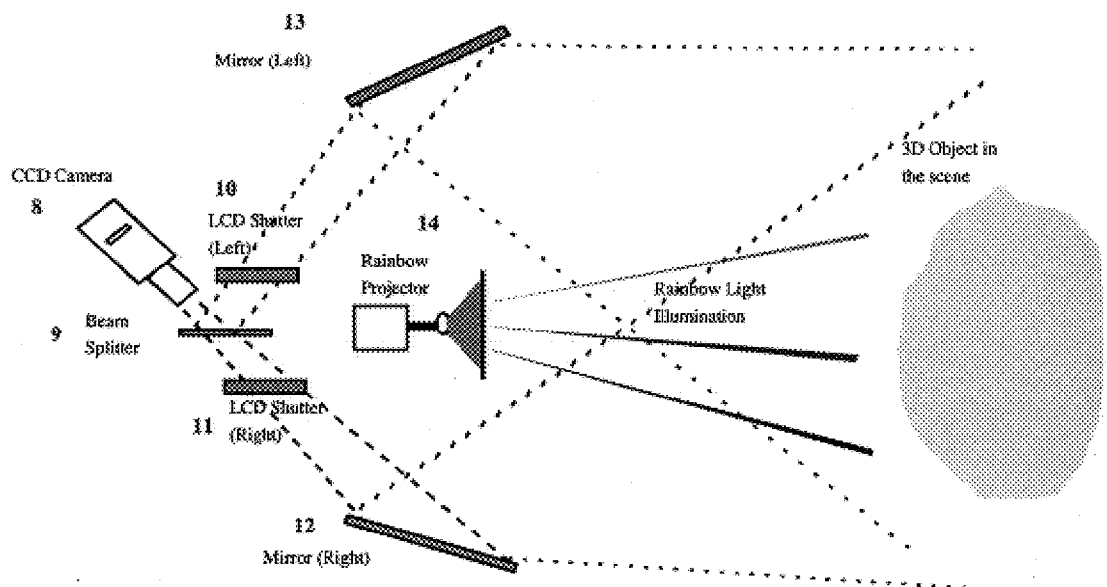
FIG. 2 shows an embodiment of the Rainbow Stereo 3D camera using one CCD and a pair LCD shutters FIG. 3 plots Spectral Characteristics of a Linear Variable Wavelength Filter (LVWF).

Although the proposed Rainbow Stereo 3D camera requires a pair of stereo images, it does not necessarily mean that we need to use two CCD cameras in the system. We discuss herein an optical design employing a pair of LCD shuttle glasses that implements the Rainbow Stereo 3D imaging function using only one CCD camera. FIG. 2 illustrates the concept.

A color CCD camera with proper lens 8, "sees" an object in the scene via two optical view paths: The first view path includes the beam splitter 9, the right LCD shuttle 11, and the right mirror 12. The second view path includes the reflection of beam splitter 9, the left LCD shuttle 10, and the left mirror 13. The rainbow projector 14 generates required rainbow illumination on the scene.

The left and right LCD shutter glasses rapidly change their light transmission rate from opaque to clear in an alternative fashion, such that at any time instance only one image (eight left or right) is captured by the CCD camera. Furthermore, the alternation rate of LCDs is synchronized with CCD's field rate at 60 Hz, so that the odd field (raw 1,3,5, . . . ) of an image captured by the CCD corresponds to the left view, and the even field (raw 2,4,6, . . . ) in the image corresponds to the right view. Therefore a pair of stereo images can be captured by a single CCD camera at CCD camera's frame rate (30 Hz).

The obvious advantages of proposed implementation scheme are:

(1) Only one CCD camera is needed to produce stereo pair images, reducing the overall system cost;
(2) There is no mechanical moving parts so the system can be built simple and reliable;
(3) LCD shutter and control unit are commercially available at very reasonable cost;
(4) Longer base line can be obtained in a more compact configuration, hence the range accuracy is increased, and
(5) The color sensitivity and spectral characteristics in left and right image pair become exactly the same since they are captured by the same CCD camera.

Notice that our Rainbow Stereo 3D camera scheme is based on color matching, hence the consistency of color sensitivity between right and left image can critically affect the 3D range accuracy. The "single CCD+LCD shutter" scheme provides a simple and elegant solution to guarantee the consistency of color responses in left and right images.

An Implementation of Rainbow Stereo Imaging System Using Multiple Locations of Single Camera The stereo image pair can also be obtained from single camera being placed in multiple locations. With known geometric location and pose of a color camera, images taken by the camera at multiple locations provide equivalent information as image obtained from multiple cameras placed in the same locations, as long as the color patterns projected onto the scene remains the unchanged during the entire imaging process.

Linear Variable Wavelength Filter (LVWF)

The key hardware components of the Rainbow Stereo 3D camera are a white fan beam generator, a linear variable wavelength filter (LVWF), a color imaging system that can provide stereo image pairs, optical lenses, and a host computer with a frame grabber board.

The LVWF is a rectangular optical glass plate coated with gradually varying wavelengths of colors. If the color spectrum of a LVWF is within visible light region, one edge of the filter rectangle corresponding to the lowest wavelength is the blue edge while the opposite edge is the red edge. The wavelength of the coated color layer is linearly proportional to the displacement of the position on the filter glass from the blue edge. This feature provides a simple and elegant way of generating structured light for an entire scene simultaneously without using any moving parts.

Figure 3:
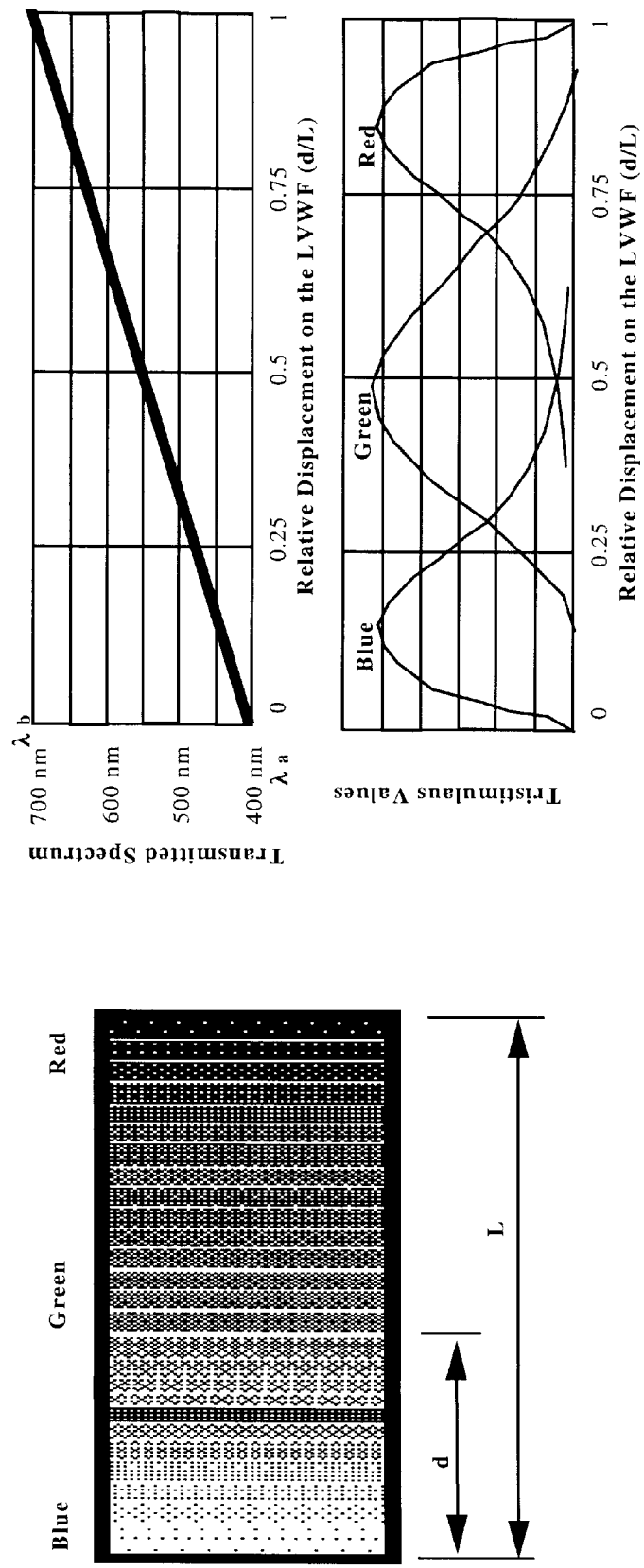

FIG. 3 shows a diagram and a typical spectrum characteristics of a LVWF. The linearity of LVWF is better than 1%. The color wavelength of the light λ passing through a particular position of the LVWF is a linear function of d, the displacement of that position from the blue edge of the filter glass:

$$\lambda(d) = \lambda_a + \frac{(\lambda_b - \lambda_a)}{L} d$$

where $\lambda_a$, $\lambda_b$ and L are filter parameters: $\lambda_a$ is the wavelength corresponding to the filter's "blue edge" (lowest wavelength color the filter can generate). $\lambda_b$ is the wavelength corresponding to the filter's "red edge" (highest wavelength color the filter can generate). L is the effective length of the filter. And d is the displacement from the blue edge.

Prism

Figure 7:
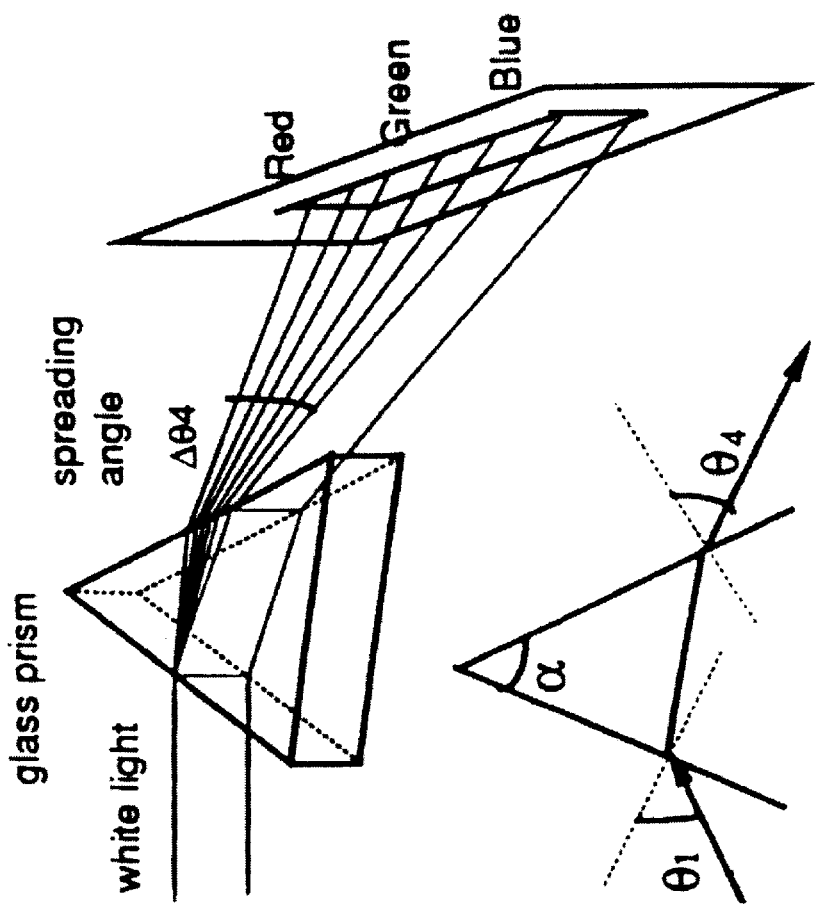
FIG. 7 shows the dispersion of white light by a prism.

Another embodiment of the color projection device is to utilize dispersion phenomena of an optical prism to produce a spatially variable wavelength illumination, as illustrated in FIG. 7.

Diffraction Grating

Figure 8:
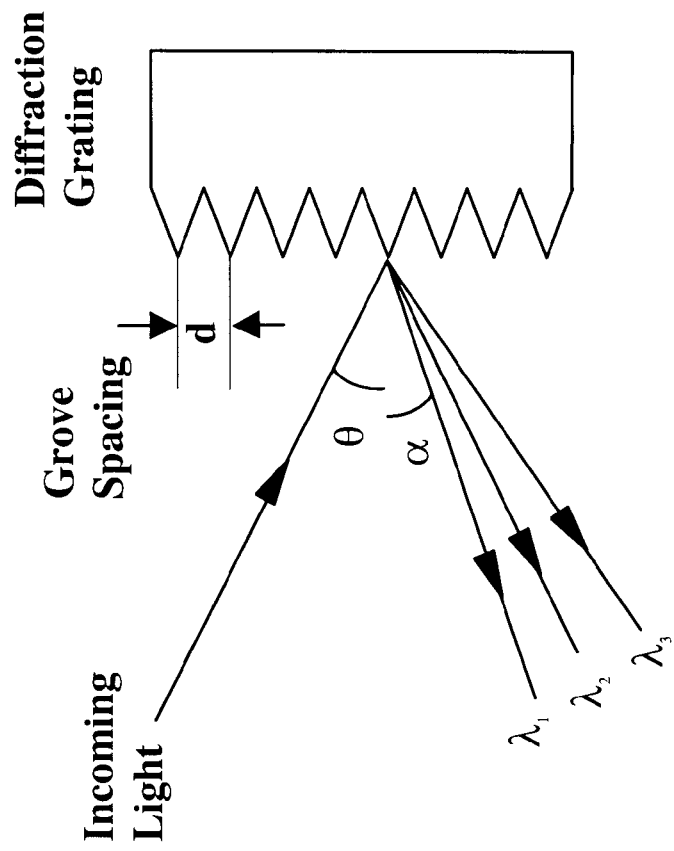
FIG. 8 shows a diffraction grating that is able to produce a spatially variable wavelength illumination.

Still another embodiment of the color projection system used in the color ranging method is to utilize the diffraction gratings to produce a spatially variable wavelength illumination, as illustrated in FIG. 8.

Color Pattern Light Projector

Figure 9:
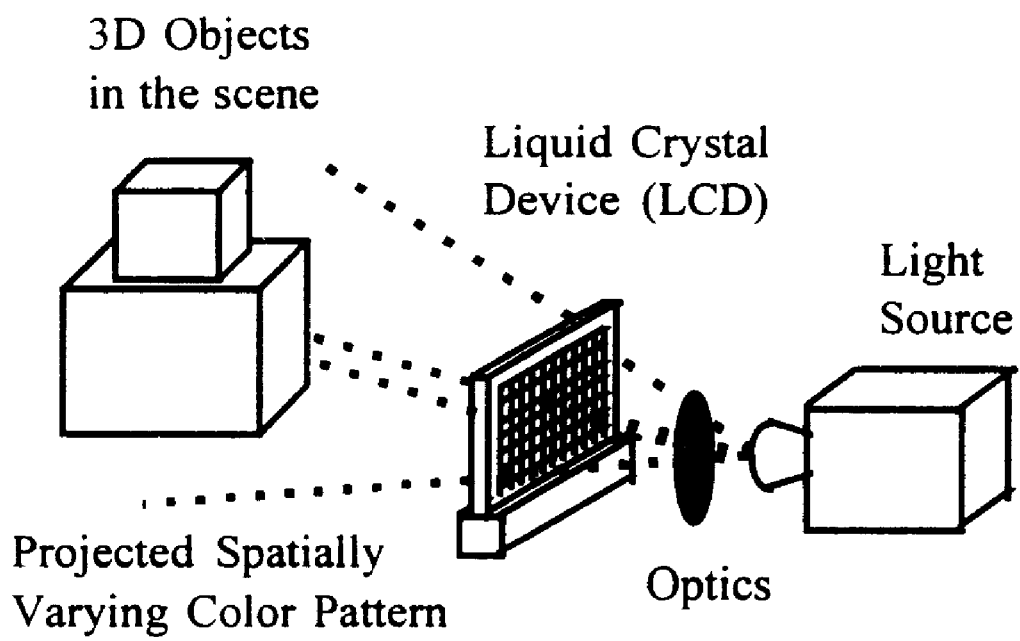
FIG. 9 shows a LCD projector as an active light pattern projection device.
Figure 10:
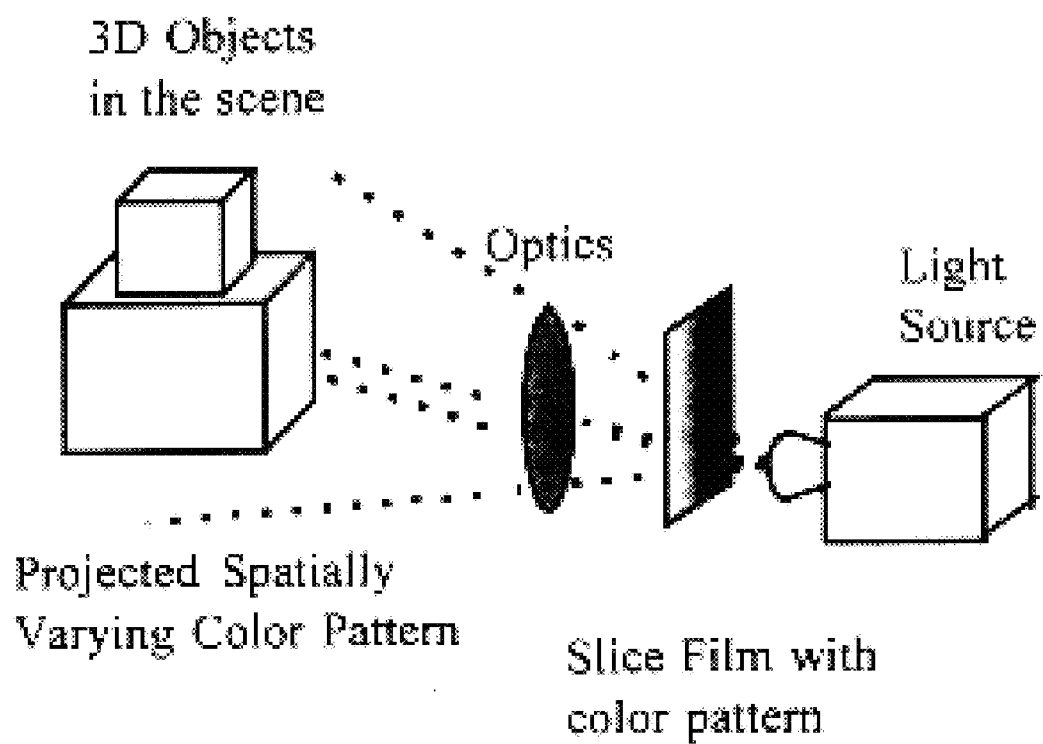
FIG. 10 shows a slice film projector as an active light pattern projection device.

The color patterns for our Rainbow stereo 3D camera do not necessarily need to be linear variable light patterns. Arbitrary color patterns can be used for the purpose of providing landmarks to object's surface so the correspondence matching can be efficiently performed. Such patterns may be generated by electronics color light projectors (LCD projector, shown in FIG. 9, for example) or mechanical light pattern projector (slice film projector, shown in FIG. 10, for example). As long as the projected color patterns have sufficiently large number of color components and sufficiently large spatial variation rate in terms of wavelength changes.

Color Representation and Comparison Scheme

The color variation in a Rainbow color patterns provide excellent surface features for stereo correspondence finding in a pair of stereo images. We employ a pair of color CCD camera or a color CCD camera with LCD shutters to capture stereo pair images. The ratios between Red, Green, and Blue (RGB) color components associated with each pixel are used to distinguish different colors and to perform pixel-wise stereo correspondence matching. In this section, we discuss the color comparison and color matching scheme.

Figure 4:
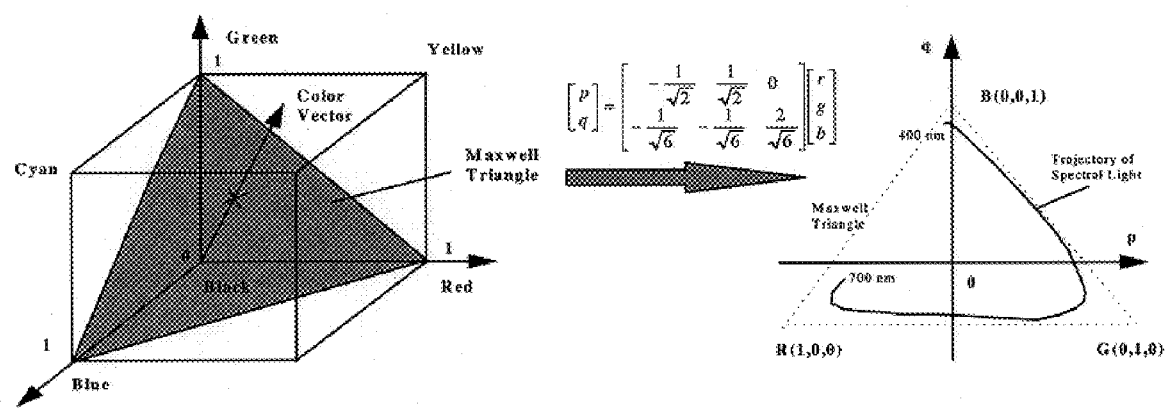
FIG. 4 presents a color representation and PQ transformation of color components.

A particular color detected by a color CCD camera may be represented by a vector in a "color space" whose coordinates are three primary colors. Using typical Red, Green, and Blue primaries (RGB) as three mutual orthogonal axes, a color space is formed as shown in FIG. 4. Notice that it is the orientation of a color vector (i.e., the ratios between R, G, and B), rather than its length, that specifies the color components. The length of a color vector only represents light intensity. Therefore only two independent variables are needed to completely represent a detected color.

We define a PQ transformation from (r,g,b) to a 2D coordinates (q, p) representing position of the intersection point of a color vector with the Maxwell triangle, as shown in FIG. 4. The color of single spectral light in visible range (from 400 nm to 700 nm can be represented as a curve in PQ space.

Two Complementary Stereo Matching Schemes

The essence of stereo matching is, given a point in one image, to find a corresponding point in another image, such that two points are the projections of the same physical point in space. Once the corresponding pixels are found in both images, and the geometric parameters of camera and base line are known, the triangulation can be performed in a straightforward fashion to find the 3D range.

The Rainbow Stereo 3D camera has a high degree of parallelism in which two complementary stereo matching schemes, namely color matching and intensity matching, can be synergistically combined to provide accurate and reliable high speed 3D measurement for a wide range of application scenario.

Color based stereo matching method presented in this invention examines color components, i.e., the ratios among R,G, and B, of pixels (or patches of pixels) in the left and right images, and determines the correspondence of a pixel pair in two images based on the similarity of colors. Due to the salient feature of the rainbow light projection which encodes particular colors to particular spatial locations, the colors of corresponding pixel in searching space is unique and distinguishable, thus pixel-to-pixel matching can be conveniently implemented.

The intensity based stereo matching method, commonly used in many stereo vision systems, examines pixel's grayscale intensities in the left and right images, and determines the correspondence of a pixel pair in two images based on the similarity of intensity variation patterns between the counterparts. Since there exists no one-to-one correspondence between intensity values of a pixel and its spatial location, the matching algorithm has to depend on the intensity variation pattern of a group of pixels to provide features, such as edges and corners, to determine a correct match.

The color matching method works best in the scenario where reflectance of object surface is relatively uniform. In this case, the projected rainbow illumination pattern provides the needed features for stereo matching. In the presence of glint or other rapid variation in reflectance, the normalization procedure may degrade due to CCD camera's nonlinearity, leading to error in 3D range measurement. However, this is exactly the condition in which intensity based stereo matching is effective. Rapid changes of intensity in two images offer dense features that can be used to localize accurately the corresponding points between two views. Thus the two method nicely complement each other and are capable of high degree of parallelism.

We can employ a synergistic combination of both methods. The combined scheme intelligently select the usage of matching methods according to the degree of intensity and color variations in the neighborhood of the pixels. The advantages of this synergistism, in comparison with each of individual one, are as follows:

(1) able to provide a robust and reliable stereo matching in a wider variety of surface conditions of color, texture, shape, and reflectance property, etc.

(2) able to provide dense range images of object surface, regardless the existence of image features like edges or corners.

(3) able to provide a stream of 3D images at high rate due to the fact that each method will be used in its best applicable conditions and the search of matching points requires less complex computation.

The innovative and revolutionary concept of using rainbow light projection and combining color matching and intensity matching schemes allow us to develop a high performance, low cost, practical real-time 3D imaging system that never exists before.

Details on Stereo Matching Algorithms

In general, find a match point in a 2D image involves a search in a 2D space. However, due to the geometrical restraint (often referred to as the epipolar line constraint) that can be readily used in stereo camera setup, the searching space for finding correspondence can be reduced into an one dimensional space on an epipolar line.

Epipolar Line Constraint

Figure 5:
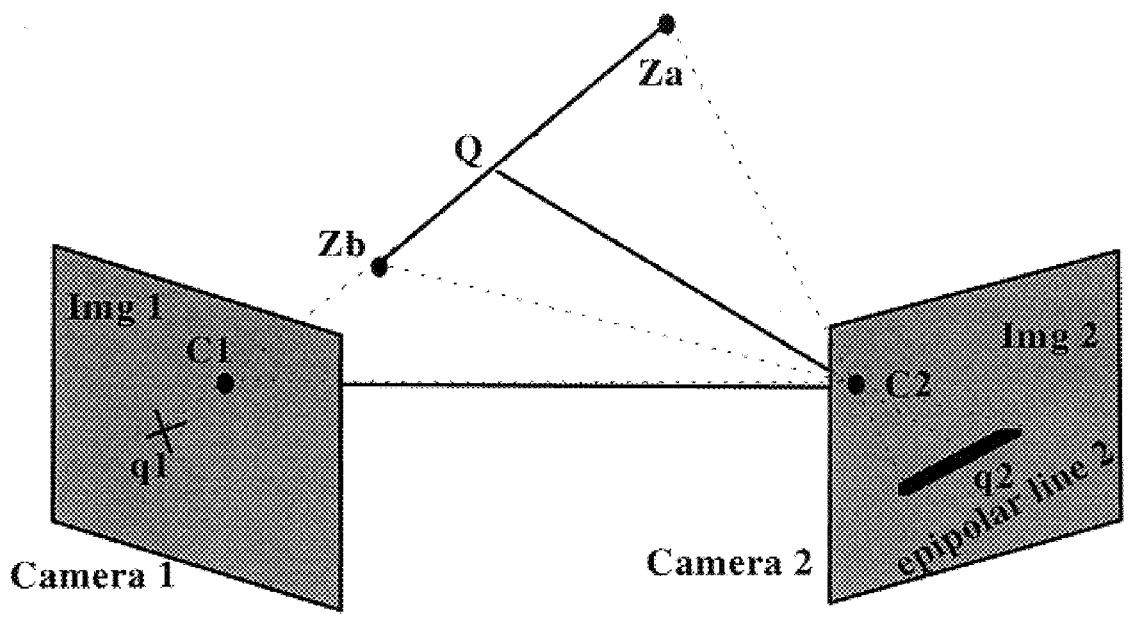
FIG. 5 shows the Epipolar Geometry

Using a pin-hole model of CCD camera, we can establish the geometrical relationship in a stereo system, as shown in FIG. 5, where $C_1$ and $C_2$ are the positions of focal points of camera 1 and camera 2. It can be observed that given a pixel $q_1$ in image plane Img1 of camera 1, all possible physical point in 3D space that may project onto $q_1$ form an infinite half-line $<q_1,Q>$. In practice, we can always assume possible Q lies within a reasonably large range between $Z_a$ and $Z_b$. As a direct consequence, all possible image points of Q along the line $<Z_a, Z_b>$ projects a line onto camera's image plane Img2, which is called the epipolar line 2. Therefore the search for matching candidate of $q_1$ on image plane Img2 can be performed along an one dimensional line segment, instead of an entire 2D image plane. Correspondence matching between $q_1$ and $q_2$ provides sufficient information to perform triangulation that computes the (x,y,z) coordinates of any point Q in a 3D space.

Two Complimentary Stereo Matching Criteria

As we mentioned before, the essence of stereo matching is, given a point in one image, to find corresponding points in another image, such that a pair of points on two images are the projections of the same physical point in space. This task requires a criterion to measure similarity between images, and the performance of stereo system is critically depended on the selected matching criterion, as discussed below:

Stereo Matching Algorithm Based on Color Difference

Figure 6:
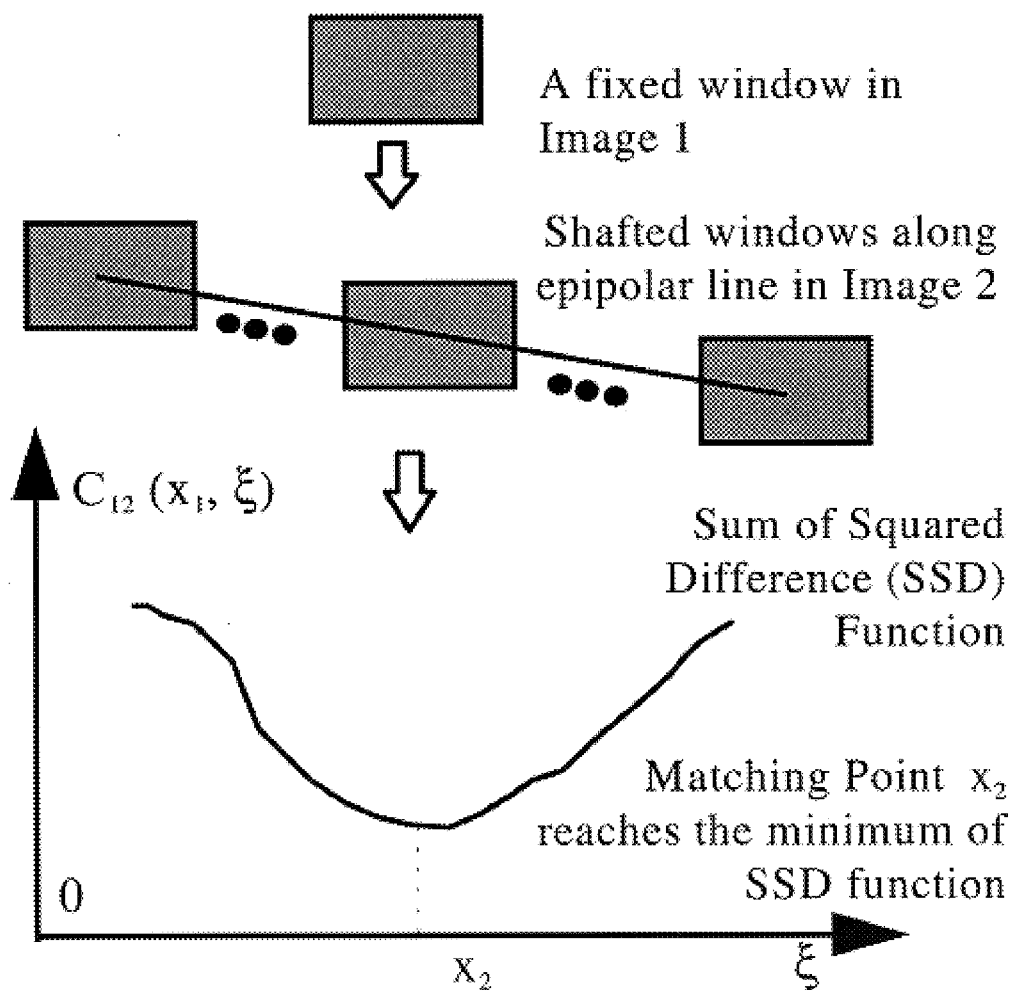
FIG. 6. Color Based Matching Using Sum of Squared Difference (SSD) Criterion.

The sum of squared difference (SSD) of color values (e.g., p and q) over a window is the simplest and most effective criterion to perform stereo matching. In its simplest form, the SSD between an image window in image 1 and an image window of the same size in image 2 is defined as:

$$C_{12}(x_1, \xi) = \sum_{i \in W} \{[(p_1(x_1+i) - p_2(\xi+i)]^2 + [q_1(x_1+i) - q_2(\xi+i)]^2\}$$

where the $$\sum_{i \in W}$$

means summation over the window, $x_1$ and $\xi$ are the index of central pixels' coordinates of the windows in two images, and p and q are the values of (p, q) representation of pixel's color. FIG. 6 illustrates the concept of color based searching.

To search for the matching point of $x_1$ on image 2, we can select $\xi$ such that $\xi$ locates along the epipolar line on image 2. Due to the uniqueness of the rainbow-like and spatially varying color illumination associated with the pixel windows along the epipolar line, there exists a minimum of SSD function. Based on the location of the minimum, the matching point of $x_1$ on image 2, denoted as $x_2$, can be determined in a straightforward fashion (winner-take-all strategy):

$$x_2 \left\{ \xi \in C_{12}(x_1, \xi) \mid \min_{\xi \in \text{Epipolar line}} [C_{12}(x_1, \xi)] \right\}$$

Other correlation methods can also be used to implement the color matching algorithm.

Stereo Matching Algorithm Based on Intensity Difference

Intensity-based correlation techniques have been investigated extensively for conventional stereo vision applications. We adopt a similarity score that is computed by comparing a fixed window, centered at a pixel under examination in image 1, to a shafted windows in image 2. Let $x_1$ be the index of position of a pixel in image 1 and $\xi$ be the index of position along its epipolar line on image 2. Zero-mean normalized cross-correlation (or correlation coefficient) as a measure of similarity between corresponding image patches, is computed as:

$$C_{12}(x_1, \xi) = \sum_{i \in W} [(I_1(x_1+i) - \overline{I_1}][(I_2(\xi+i) - \overline{I_2}] / \sqrt{Var_1(x_1)Var_2(\xi)} \, \xi)$$

where $I_1$ and $I_2$ are intensities of pixels in the image 1 and image 2, respectively. $\overline{I_1}$, $\overline{I_2}$, $Var_1(\xi)$ and $Var_2(\xi)$ are means and variances of intensity over the matching windows in image 1 and image 2.

A function of correlation scores for $x_1$ is generated for matching candidates along the epipolar line. The pixel corresponding to the largest peak is then taken as the matching pixel, provided that the peak value exceeds zero.

Stereo Matching Based on Synergistic Use of Color and Intensity Information

From our previous experience, we discovered that matching criterion based on color work best for the scenario where reflectance of surface is relatively uniform. In this case, the projected rainbow illumination pattern provides the needed features for stereo matching. In the presence of glint or other rapid variation in reflectance, the normalization procedure may degrade and lead to error in 3D range measurement. However, this is exactly the condition in which intensity based stereo matching is effective. Rapid changes of intensity in two images offer dense features that can be used to localize accurately the corresponding points between two views. On the other hand, for a featureless surface such as a flat wall with uniform color, it is difficult, if not impossible to find pixel to pixel corresponding points based on intensity correlation methods. Thus the two method nicely complement each other and are capable of high degree of parallelism.

In searching for a stereo matching using combined color/intensity matching scheme, variance of intensity over a window area surrounding each pixel is computed. The value of variance serves as the weight that determines the contribution of intensity-based and color-based matching scores. The matching will be selected according to overall scores. This scheme results in a simple and robust pixel to pixel stereo matching algorithm that is amenable to real-time implementation.

Multiple Modes Sensing Capability and Sensor Data Fusion

The color spectrum and intensity information of 2D stereo image pair captured by CCD cameras provides sufficient geometry information for 3D triangulation. In addition to this, the same 2D color images can be use as normal color images of the same scene.

3D Range images and 2D color images, both acquired by the same camera, provide complementary information. Range data provides important clues on the 3D geometry of an observed surface. However, it does not provide any information about physical properties of the features such as color or fixture pattern therefore it very computational intensive to recognize an object using solely range images. On the other hand, with color and intensity information of an object on the scene, pattern recognition is much easier, but it is extremely difficult to extract geometrical information from 2D color or intensity image data. Therefore, both types of data can be analyzed together synergetically. In our Rainbow 3D camera, there is no correspondence problem between range data and normal intensity image data since they are captured using exactly the same camera in the same place. This feature simplifies multiple sensor fusion over conventional techniques such as stereo vision, where the correspondence between range data and the corresponding point in the color image is difficult to determine, and in some cases is impossible to determine.

What is claimed is:

1. An apparatus for obtaining 3D image of objects in a scene, comprising
   (a) a light projection means for generating a bundle of light rays with spatially varying wavelengths to illuminate surface of objects in the scene such that spatially varying color patterns are formed on the surface of objects through the light projection, and
   (b) a sensor means for acquiring images of objects in the scene from multiple viewing locations, based on which the wavelengths can be detected of light rays reflected from objects' surface that is illuminated by said light projection means, and
   (c) a calibration means for determining the geometric and optical parameters of the said sensor means at multiple viewing locations, and
   (d) a data comparison means for matching the correspondence pixels in multiple data sets obtained from the said sensor means based on their wavelength values and/or local color patterns, and
   (e) a data extraction means for computing distances in the 3D space between sensor means and surface points in the scene, and therefore determining 3D coordinates of surface points of objects in the scene, based on information of (i) locations of the matched correspondence points in multiple images obtained by the said sensor means based on color comparison, and (ii) geometric and optical parameters of the said sensor means obtained by the said calibration means, whereby 3D images, in which each pixel value represents a 3D distance between the said sensor means and a surface point on objects in the scene that corresponds to the pixel, can be obtained using triangulation principle.

2. An apparatus as recited in claim 1, wherein the surface illumination is generated by a light projection means selected from the group consisting of:

(a) a light source and a variable wavelength filter, (b) a light source and a prism, (c) a light source and a diffraction grating, (d) liquid crystal device (LCD) projectors, and (e) a slice film projector and color slices, for producing a bundle of light rays spreading simultaneously more than one dimensions and with spatially varying wavelengths.

3. An apparatus for obtaining 3D image of objects in a scene, comprising (a) a light projection means for generating a bundle of light rays with spatially varying wavelengths to illuminate surface of objects in the scene such that spatially varying wavelength patterns are formed on the surface of objects through the light projection, and (b) a sensor means comprises a set of multiple color CCD cameras that provide a set of multiple stereo color images of objects in the scene from multiple viewing locations, based on which the wavelengths can be detected of light rays reflected from objects' surface that is illuminated by said light projection means, and (c) a calibration means for determining the geometric and optical parameters of the said sensor means at multiple viewing locations, and (d) a data comparison means for matching the correspondence pixels in multiple data sets obtained from the said sensor means based on their wavelength values and/or local color patterns, and (e) a data extraction means for computing distances in the 3D space between the sensor means and surface points in the scene, and therefore determining 3D coordinates of surface points of objects in the scene, based on information of (i) locations of the matched correspondence points in multiple images obtained by the said sensor means based on color comparison, and (ii) geometric and optical parameters of the said sensor means obtained by the said calibration means, whereby 3D images, in which each pixel value represents a 3D distance between the said sensor means and a surface point of objects in the scene that corresponds to the pixel, can be obtained using triangulation principle.

4. An apparatus as recited in claim 3, wherein the surface illumination is generated by a light projection means selected from the group consisting of:

(a) a light source and a variable wavelength filter, (b) a light source and a prism, (c) a light source and a diffraction grating, (d) liquid crystal device (LCD) projectors, and (e) a slice film projector and color slices, for producing a bundle of light rays spreading simultaneously more than one dimensions and with spatially varying wavelengths.

5. An apparatus for obtaining 3D image of objects in a scene, comprising (a) a light projection means for generating a bundle of light rays with spatially varying wavelengths to illuminate surface of objects in the scene such that spatially varying wavelength patterns are formed on the surface of objects through the light projection, and (b) a sensor means comprises single color CCD camera with a multiple image collecting means, which enables the single camera to capture color images of objects in the scene from multiple viewing points to form stereo image pairs, based on which the wavelengths can be detected of light rays reflected from objects' surface that is illuminated by said light projection means, and (c) a calibration means for determining the geometric and optical parameters of the said sensor means at multiple viewing locations, and (d) a data comparison means for matching the correspondence pixels in multiple data sets obtained from the said sensor means based on their wavelength values and/or local color patterns, and (e) a data extraction means for computing distances in the 3D space between the sensor means and surface points in the scene, and therefore determining 3D coordinates of surface points of objects in the scene, based on information of (i) locations of the matched correspondence points in multiple images obtained by the said sensor means based on color comparison, and (ii) geometric and optical parameters of the said sensor means obtained by the said calibration means, whereby 3D images, in which each pixel value represents a 3D distance between the said sensor means and a surface point of objects in the scene that corresponds to the pixel, can be obtained using triangulation principle.

6. An apparatus as recited in claims 5, wherein the surface illumination is generated by a light projection means selected from the group consisting of:

(a) a light source and a variable wavelength filter, (b) a light source and a prism, (c) a light source and a diffraction grating, (d) liquid crystal device (LCD) projectors, and (e) a slice film projector and color slices, for producing a bundle of light rays spreading simultaneously more than one dimensions and with spatially varying wavelengths.

* * * * *